United States Patent
Goto (10) Patent No.: US 9,158,318 B2
(45) Date of Patent: Oct. 13, 2015

(54) POWER SUPPLY APPARATUS WHICH SUPRRESSES OUTPUT VOLTAGE VARIATION

(71) Applicant: KABUSHIKI KAISHA TOSHIBA, Minato-ku, Tokyo (JP)

(72) Inventor: Yuichi Goto, Kanagawa-ken (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 119 days.

(21) Appl. No.: 13/776,279

(22) Filed: Feb. 25, 2013

(65) Prior Publication Data

US 2014/0062432 A1 Mar. 6, 2014

(30) Foreign Application Priority Data

Aug. 29, 2012 (JP) ................. 2012-188466

(51) Int. Cl.
G05F 1/00 (2006.01)
G05F 1/46 (2006.01)
G05F 1/10 (2006.01)

(52) U.S. Cl.
CPC . *G05F 1/462* (2013.01); *G05F 1/10* (2013.01)

(58) Field of Classification Search
CPC .................................. G05F 1/575; G05F 1/56
USPC ......... 323/273, 274, 275, 282, 283, 285, 286, 323/289, 349
See application file for complete search history.

(56) References Cited

U.S. PATENT DOCUMENTS

| 6,414,537 B1* | 7/2002 | Smith ............................ 327/540 |
| 7,012,411 B2* | 3/2006 | Yasukouchi .................. 323/282 |
| 8,076,911 B2 | 12/2011 | Ariki |
| 8,148,960 B2* | 4/2012 | Tonomura ..................... 323/273 |
| 2003/0042971 A1* | 3/2003 | Oikawa et al. ................. 327/540 |
| 2009/0302811 A1* | 12/2009 | Nihei et al. ..................... 323/217 |
| 2010/0026259 A1 | 2/2010 | Ozaki et al. |
| 2011/0012576 A1 | 1/2011 | Goto |
| 2012/0062191 A1* | 3/2012 | Goto ............................. 323/271 |
| 2012/0176108 A1 | 7/2012 | Goto |
| 2012/0242305 A1 | 9/2012 | Goto |
| 2013/0169251 A1* | 7/2013 | Wan et al. ..................... 323/282 |

FOREIGN PATENT DOCUMENTS

| JP | 04117716 A | 4/1992 |
| JP | 04242808 A | 8/1992 |

(Continued)

OTHER PUBLICATIONS

Goto JP Pub. No. 2012060854, DC-DC Converter, English Translation, pp. 1-12.*

(Continued)

*Primary Examiner* — Adolf Berhane
*Assistant Examiner* — Alex Torres-Rivera
(74) *Attorney, Agent, or Firm* — Holtz, Holtz, Goodman & Chick PC (57) ABSTRACT

According to one embodiment, the voltage divider circuit divides the output voltage, and generates a feedback voltage. The output voltage switching transistor has one end connected to a feedback voltage side, and operates based on an output voltage switching signal. The first condenser has one end connected to the one end of the output voltage switching transistor, and the other end connected to a control terminal of the output voltage switching transistor.

10 Claims, 9 Drawing Sheets

(56) References Cited

FOREIGN PATENT DOCUMENTS

| | | | |
|---|---|---|---|
| JP | 9-297623 A | 11/1997 | |
| JP | 09297623 A | 11/1997 | |
| JP | 2003124751 A | 4/2003 | |
| JP | 2006-260130 A | 9/2006 | |
| JP | 2007159288 A | 6/2007 | |
| JP | 2008083850 A | 4/2008 | |
| JP | 2009-003886 A | 1/2009 | |
| JP | 2012-045183 A | 3/2012 | |
| JP | 2012060854 A | * 3/2012 | |

OTHER PUBLICATIONS

Japanese Office Action dated Jan. 16, 2015, issued in counterpart Japanese Application No. 2012-188466.

Japanese Office Action (and English translation thereof) dated May 15, 2015, issued in counterpart Japanese Application No. 2012-188466.

* cited by examiner

POWER SUPPLY APPARATUS WHICH SUPRRESSES OUTPUT VOLTAGE VARIATION

CROSS REFERENCE TO RELATED APPLICATION

This application is based upon and claims the benefit of priority from the prior Japanese Patent Application No. 2012-188466, filed on Aug. 29, 2012, the entire contents of which are incorporated herein by reference.

FIELD

Embodiments described herein relate to a power supply apparatus.

BACKGROUND

A constant-voltage power supply apparatus, such as a series regulator, a DC-DC converter, a switching regulator, or the like, divides an output voltage by resistors to generate a feedback voltage, and compares the feedback voltage with a reference voltage to output a constant output voltage. A power supply apparatus generating a plurality of output voltages includes voltage divider resistors dividing an output voltage, and switches a value of a portion of the voltage divider resistors by a transistor to output a different-level output voltage.

In the power supply apparatus, a voltage variation such as an overshoot or an undershoot occurs in an output voltage switching operation. Therefore, in comparison with a target voltage for switching, an output voltage may become an overvoltage, or may be primarily lower than a predetermined value.

DETAILED DESCRIPTION

According to one embodiment, a power supply apparatus includes an output transistor, a voltage divider circuit, an output voltage switching transistor, a first condenser, and a differential amplifier circuit. The output transistor includes one end to which an input voltage is input and the other end from which an output voltage is output. The voltage divider circuit generates a feedback voltage. The output voltage switching transistor includes one end connected to the feedback voltage side and operates based on an output voltage switching signal. The first condenser includes one end connected to one end of the output voltage switching transistor and the other end connected to a control terminal of the output voltage switching transistor. The differential amplifier circuit includes a first input portion to which a reference voltage is input and a second input portion to which the feedback voltage is input. The differential amplifier circuit operates so that a first feedback voltage is input to the second input portion when the output voltage switching transistor is turned on, and so that a second feedback voltage, which is higher than the first feedback voltage, is input to the second input portion when the output voltage switching transistor is turned off.

Hereinafter, further embodiments will be described with reference to the drawings. In the drawings, like reference numerals denote like elements.

Figure 1:
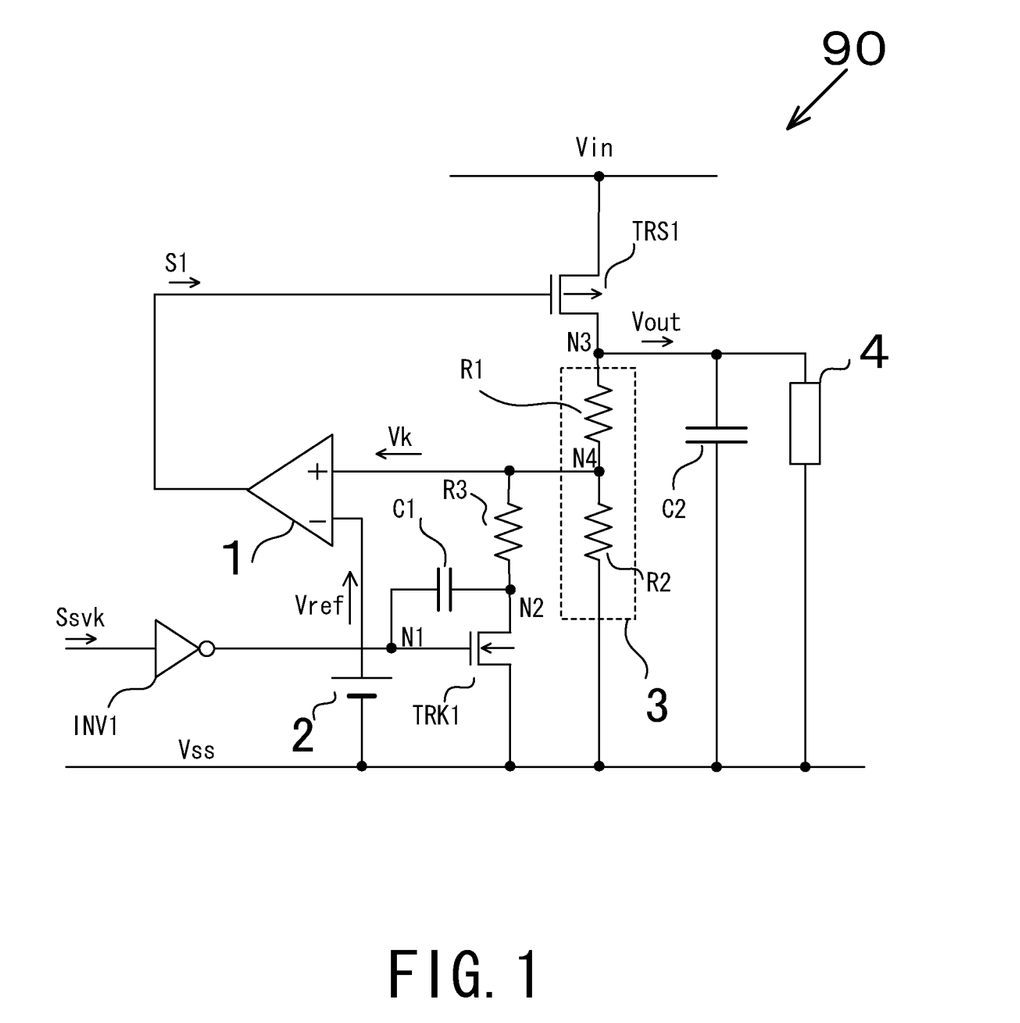
FIG. 1 is a circuit diagram illustrating a configuration of a series regulator according to a first embodiment.
Figure 2:
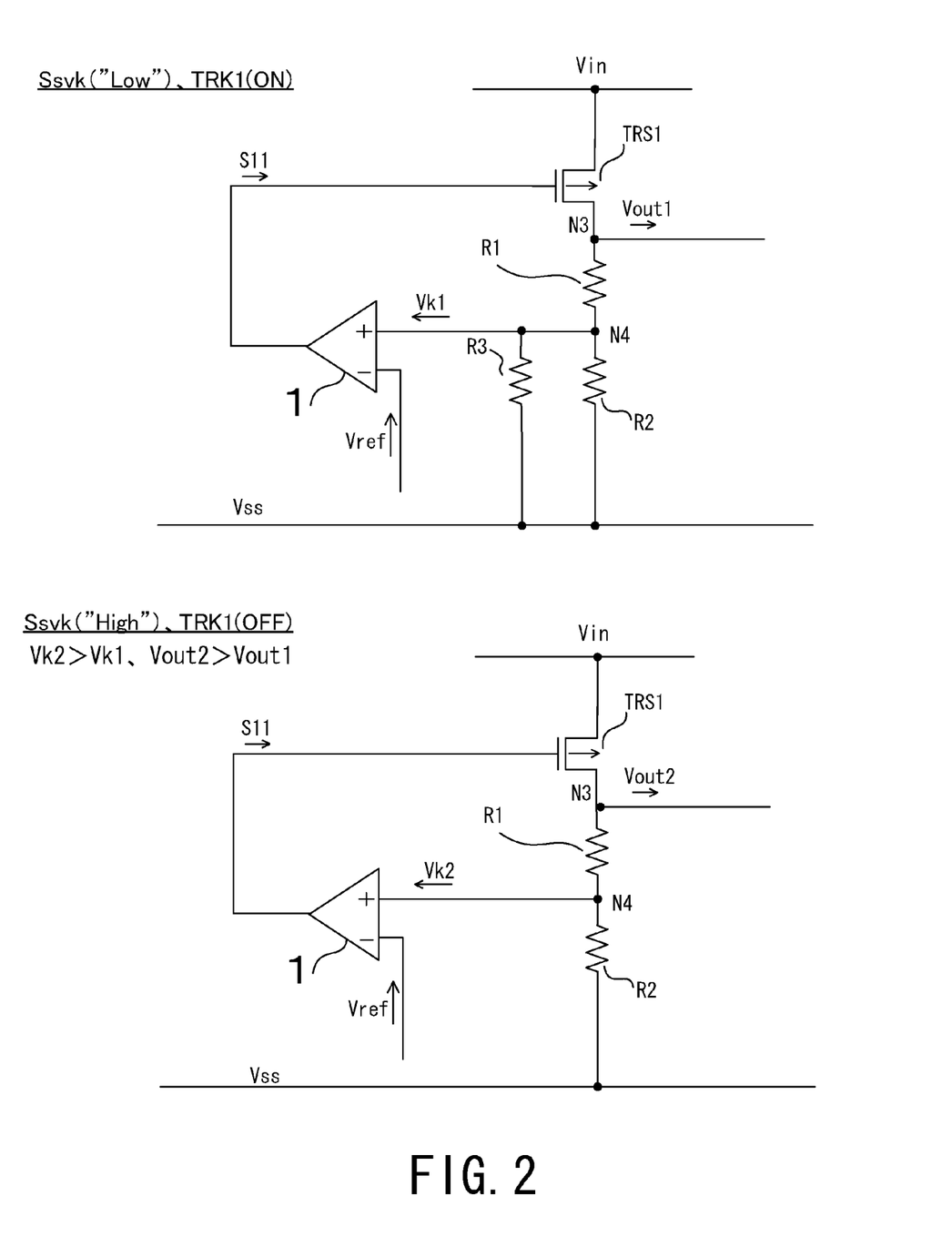
FIG. 2 is a diagram illustrating the relation between an output voltage and a feedback voltage according to the first embodiment.

As an output voltage switching power supply apparatus according to a first embodiment, a series regulator will be described with reference to the drawings. FIG. 1 is a circuit diagram illustrating a configuration of the series regulator. FIG. 2 is a diagram illustration the relation between an output voltage and a feedback voltage.

As illustrated in FIG. 1, a series regulator 90 includes a differential amplifier circuit 1, a power supply 2, a voltage divider circuit 3, a condenser C1, an inverter INV1, a resistor R3, an output voltage switching transistor TRK1, and an output transistor TRS1.

The series regulator 90 is a voltage-drop series regulator that drops an input voltage Vin. The series regulator 90 is an output voltage switching power supply apparatus that generates two types of output voltages by an on/off operation of the output voltage switching transistor TRK1. For example, when the input voltage Vin is 17 V, the series regulator 90 generates a first output voltage Vout1 of 11 V and a second output voltage Vout2 of 15 V alternately.

The output transistor TRS1 is a P-channel MOSFET (Metal Oxide Semiconductor Field Effect Transistor). The output transistor TRS1 has a first terminal (source, one end) to which the input voltage Vin is input, a control terminal (gate) to which a signal S1 output from the differential amplifier circuit 1 is input, and a second terminal (drain, the other end) connected to a node N3. The output transistor TRS1 is turned on/off based on the signal S1, and outputs an output voltage Vout from the node N3 (second terminal (drain), the other end).

A condenser C2 and a load 4 are provided outside the series regulator 90. The condenser C2 is a stabilizing condenser that stabilizes the output voltage Vout. The condenser C2 has one end connected to the node N3, and the other end connected to a low-potential power supply (ground potential) Vss. The output voltage Vout is supplied to the load 4.

The voltage divider circuit 3 is provided between the node N3 and the low-potential power supply (ground potential) Vss. The voltage divider circuit 3 includes a resistor R1 and a resistor R2 that are connected in series. The resistor R1 has one end connected to the node N3, and the other end connected to a node N4. The resistor R2 has one end connected to the node N4, and the other end connected to the low-potential power supply (ground potential) Vss. The voltage divider circuit 3 outputs a voltage, which is generated by dividing the input voltage Vin by a resistor, from the node N4.

The resistor R3 has one end connected to the node N4, and the other end connected to a node N2. The inverter INV1 receives an input of an output voltage switching signal Ssvk and outputs an inverted signal to a node N1.

The output voltage switching transistor TRK1 is an N-channel MOSFET. The output voltage switching transistor TRK1 has a first terminal (drain, one end) connected to the node N2, a control terminal (gate) connected to the node N1, and a second terminal (source) connected to the low-potential power supply (ground potential) Vss. The condenser C1 has one end connected to the node N2 (the other end of the resistor R3), and the other end connected to the node N1 (the control terminal (gate) of the output voltage switching transistor TRK1). By providing the condenser C1, a voltage variation in switching is alleviated by a mirror effect of the output voltage switching transistor TRK1 in an on/off operation of the output voltage switching transistor TRK1. Specifically, the condenser C1 functions as a phase compensation condenser of the output voltage switching transistor TRK1. By the condenser C1, a phase margin of the output voltage switching transistor TRK1 can be improved, and a gain increase range can be considerably widened. Further, by the condenser C1, a ringing in a switching operation of the output voltage switching transistor TRK1 can be considerably suppressed.

Herein, an N-channel MOSFET is used as the output voltage switching transistor TRK1, but the invention is not limited thereto. Instead of an N-channel MOSFET, a P-channel MOSFET, a bipolar transistor, and a J-FET, or the like may be used as the output voltage switching transistor TRK1.

The power supply 2 is provided between a minus (−) input port of the differential amplifier circuit 1 and the low-potential power supply (ground potential) Vss. The power supply 2 outputs a reference voltage Vref to the minus (−) input port of the differential amplifier circuit 1.

The differential amplifier circuit 1 is a non-inverting comparator. The differential amplifier circuit 1 has a minus (−) input port (first input portion) to which the reference voltage Vref is input, and a plus (+) input port (second input portion) to which a resistor-divided feedback voltage Vk is input. When the feedback voltage Vk is higher than the reference voltage Vref, a "high" level signal is output from the differential amplifier circuit 1. When the feedback voltage Vk is lower than the reference voltage Vref, a "low" level signal is output from the differential amplifier circuit 1. The differential amplifier circuit 1 outputs a differentially amplified signal S1.

Herein, as illustrated in FIG. 2, when the output voltage switching signal Ssvk is at "low" level and the node N1 is at "high" level, the output voltage switching transistor TRK1 is turned on. In this case, the resistor R2 and the resistor R3 are connected in parallel. When a resistance value of resistors connected in parallel is denoted by rb, a resistance value of the resistor R2 is denoted by r2, and a resistance value of the resistor R3 is denoted by r3, the relation is expressed as Equation (1) below.

$$rb = (r2 \times r3)/(r2+r3) \quad (1)$$

wherein, rb<r2.

When a resistance value of the resistor R1 is denoted by r1, the relation between a first feedback voltage Vk1 input to the plus (+) input port of the differential amplifier circuit 1 and a first output voltage Vout1 being a voltage of the node N3 is expressed as Equation (2) below.

$$Vk1 = \{rb \times Vout1\}/\{rb+r1\} \quad (2)$$

When the output voltage switching signal Ssvk is at "high" level and the node N1 is at "low" level, the output voltage switching transistor TRK1 is turned off. In this case, the resistor R3 does not contribute, and the relation between a second feedback voltage Vk2 input to the plus (+) input port of the differential amplifier circuit 1 and a second output voltage Vout2 being a voltage of the node N3 is expressed as Equation (3) below.

$$Vk2 = \{r2 \times Vout2\}/\{r2+r2\} \quad (3)$$

wherein, the second feedback voltage Vk2 is set to be higher than the first feedback voltage Vk1, and the second output voltage Vout2 is set to be higher than the first output voltage Vout1.

When the resistance value r1 of the resistor R1, the resistance value r2 of the resistor R2, and the resistance value r3 of the resistor R3 are set to predetermined values and the input voltage Vin is 17 V, the first output voltage Vout1 may be set to 11 V and the second output voltage Vout2 may be set to 15 V.

Figure 3:
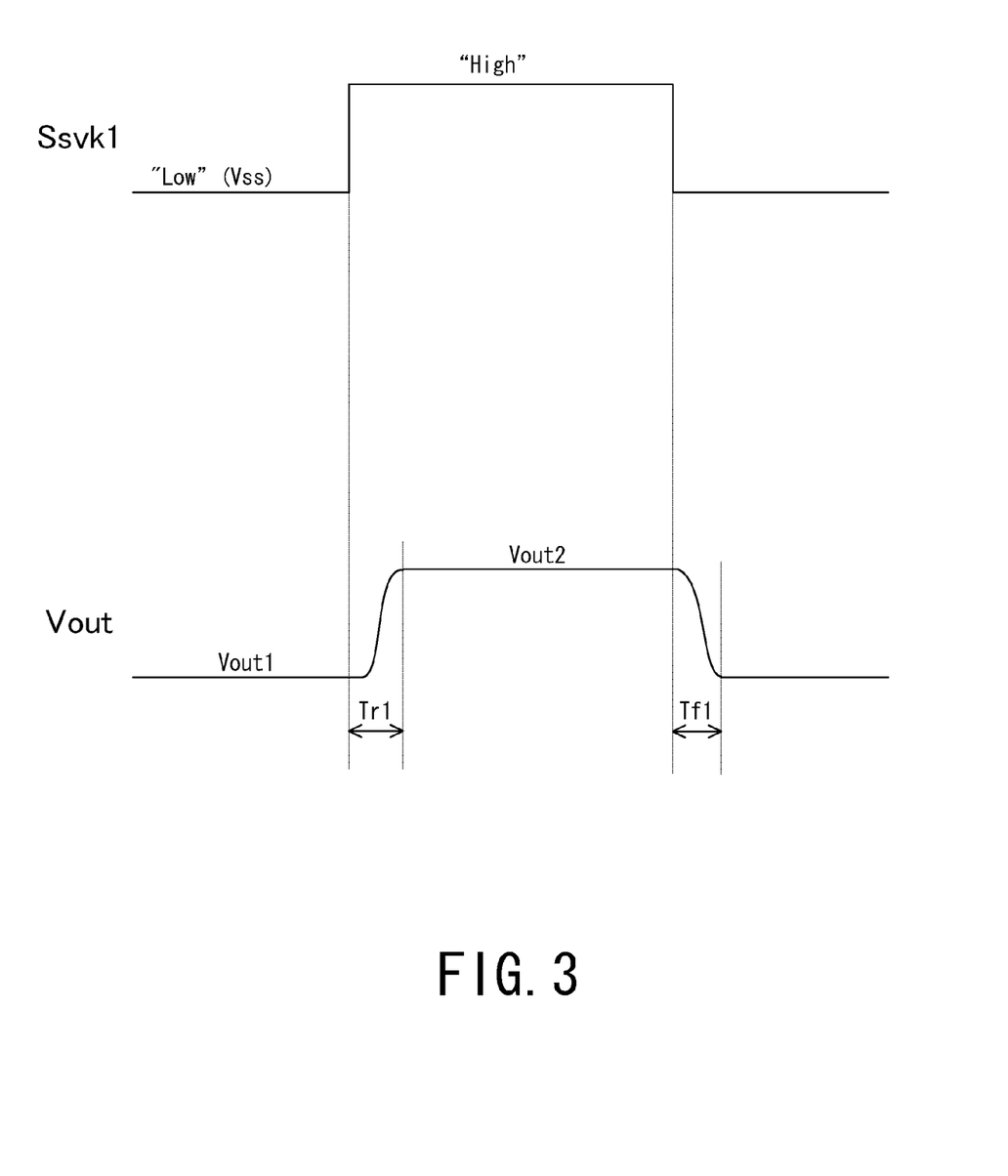
FIG. 3 is a timing chart illustrating an operation of the series regulator according to the first embodiment.
Figure 4:
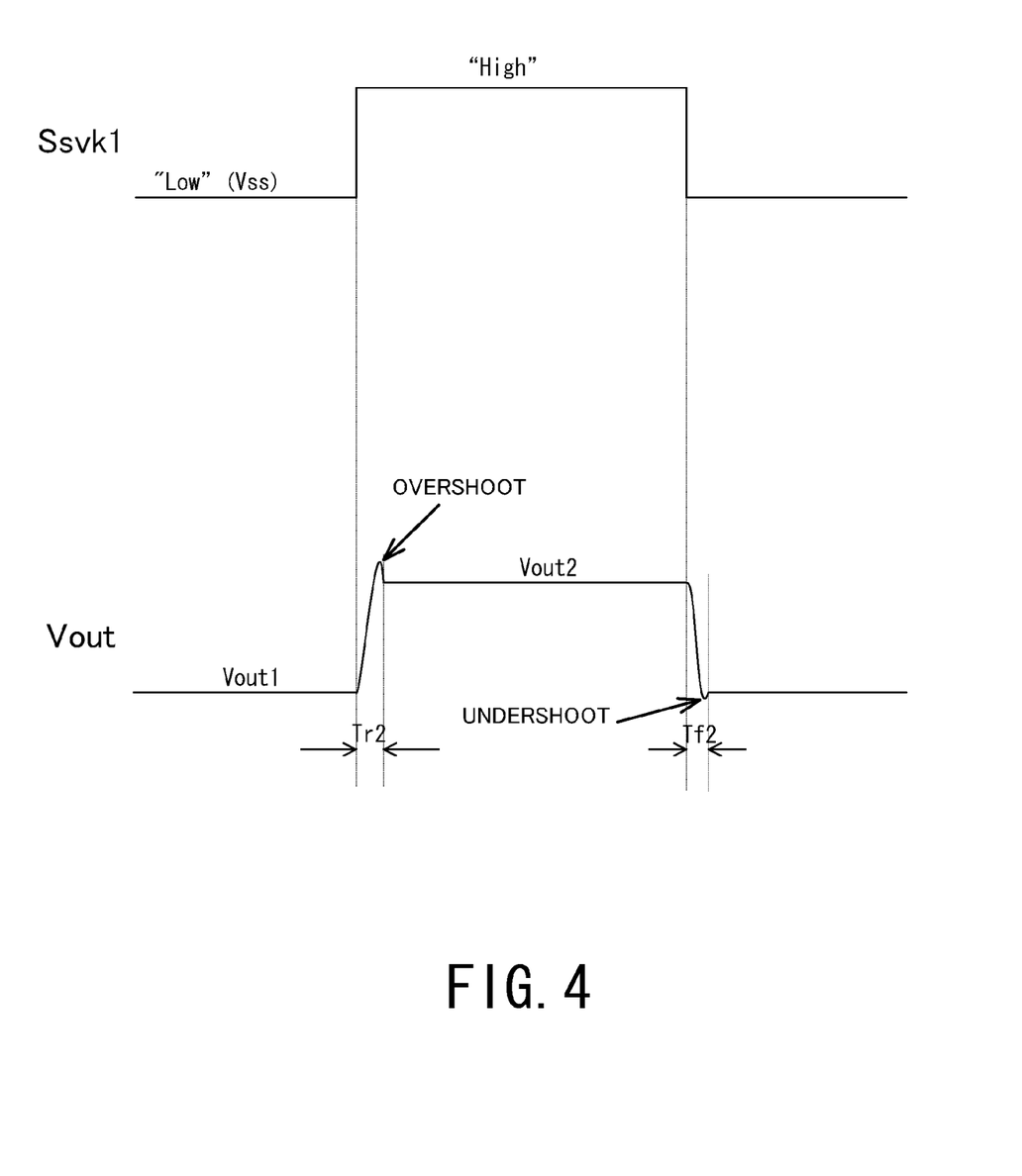
FIG. 4 is a timing chart illustrating an operation of a series regulator of a comparative example according to the first embodiment.

Next, operations of the series regulator before/after the output voltage switching will be described with reference to FIGS. 3 and 4. FIG. 3 is a timing chart illustrating an operation of the series regulator. FIG. 4 is a timing chart illustrating an operation of a series regulator of a comparative example. Herein, the series regulator of the comparative example does not include a condenser between the drain and gate of the output voltage switching transistor.

As illustrated in FIG. 3, in the series regulator 90 of the embodiment, when the output voltage switching signal Ssvk changes from "low" level to "high" level, the output voltage switching transistor TRK1 changes from an on state to an off state. The series regulator 90 is provided with the condenser C1. Therefore, as for a change from the first output voltage Vout1 to the second output voltage Vout2, a rise is delayed with respect to a change of the output voltage switching signal Ssvk (change from "low" level to "high" level). Thus, a rise slope becomes gentle, and the voltage becomes the second output voltage Vout2 after the lapse of a rise time Tr1. In this case, an overshoot does not occur.

In the series regulator 90 of the embodiment, when the output voltage switching signal Ssvk changes from "high" level to "low" level, the output voltage switching transistor TRK1 changes from an off state to an on state. The series regulator 90 is provided with the condenser C1. Therefore, as for a change from the second output voltage Vout2 to the first output voltage Vout1, a fall is delayed with respect to a change of the output voltage switching signal Ssvk (change from "high" level to "low" level). Thus, a fall slope becomes gentle, and the voltage becomes the first output voltage Vout1 after the lapse of a fall time Tf1. In this case, an undershoot does not occur.

On the other hand, as illustrated in FIG. 4, in the series regulator of the embodiment, when the output voltage switching signal Ssvk changes from "low" level to "high" level, the output voltage switching transistor TRK1 changes from an on state to an off state. The series regulator of the comparative example is not provided with the condenser C1. Therefore, as for a change from the first output voltage Vout1 to the second output voltage Vout2, a rise slope become steep, and the voltage becomes the second output voltage Vout2 after the lapse of a rise time Tr2. In this case, an overshoot occurs. Herein, the relation between the rise time Tr1 and the rise time Tr2 is expressed as Equation (4) below.

$$Tr1 >> Tr2 \quad (4)$$

The rise time Tr1 is, for example, ten times the rise time Tr2.

In the series regulator of the comparative example, when the output voltage switching signal Ssvk changes from "high" level to "low" level, the output voltage switching transistor TRK1 changes from an off state to an on state. The series regulator of the comparative example is not provided with the condenser C1. Therefore, as for a change from the second output voltage Vout2 to the first output voltage Vout1, a fall slope become steep, and the voltage becomes the first output voltage Vout1 after the lapse of a fall time Tf2. In this case, an undershoot occurs. Herein, the relation between the fall time Tf1 and the fall time Tf2 is expressed as Equation (5) below.

$$Tf1 >> Tf2 \quad (5)$$

The fall time Tf1 is, for example, eight times the fall time Tf2.

As described above, the series regulator as the output voltage switching power supply apparatus of the embodiment includes the differential amplifier circuit 1, the power supply 2, the voltage divider circuit 3, the condenser C1, the inverter INV1, the resistor R3, the output voltage switching transistor TRK1, and the output transistor TRS1. The voltage divider circuit 3 includes a resistor R1 and a resistor R2 that are connected in series. The condenser C1 is provided between the first terminal (drain) and the control terminal (gate) of the output voltage switching transistor TRK1.

By providing the condenser C1, a voltage variation of the feedback voltage Vk input to the plus (+) input port of the differential amplifier circuit 1 can be alleviated by the mirror effect of the output voltage switching transistor TRK1 in the on/off operation of the output voltage switching transistor TRK1. Therefore, a voltage variation in the output voltage switching can be considerably suppressed.

Figure 5:
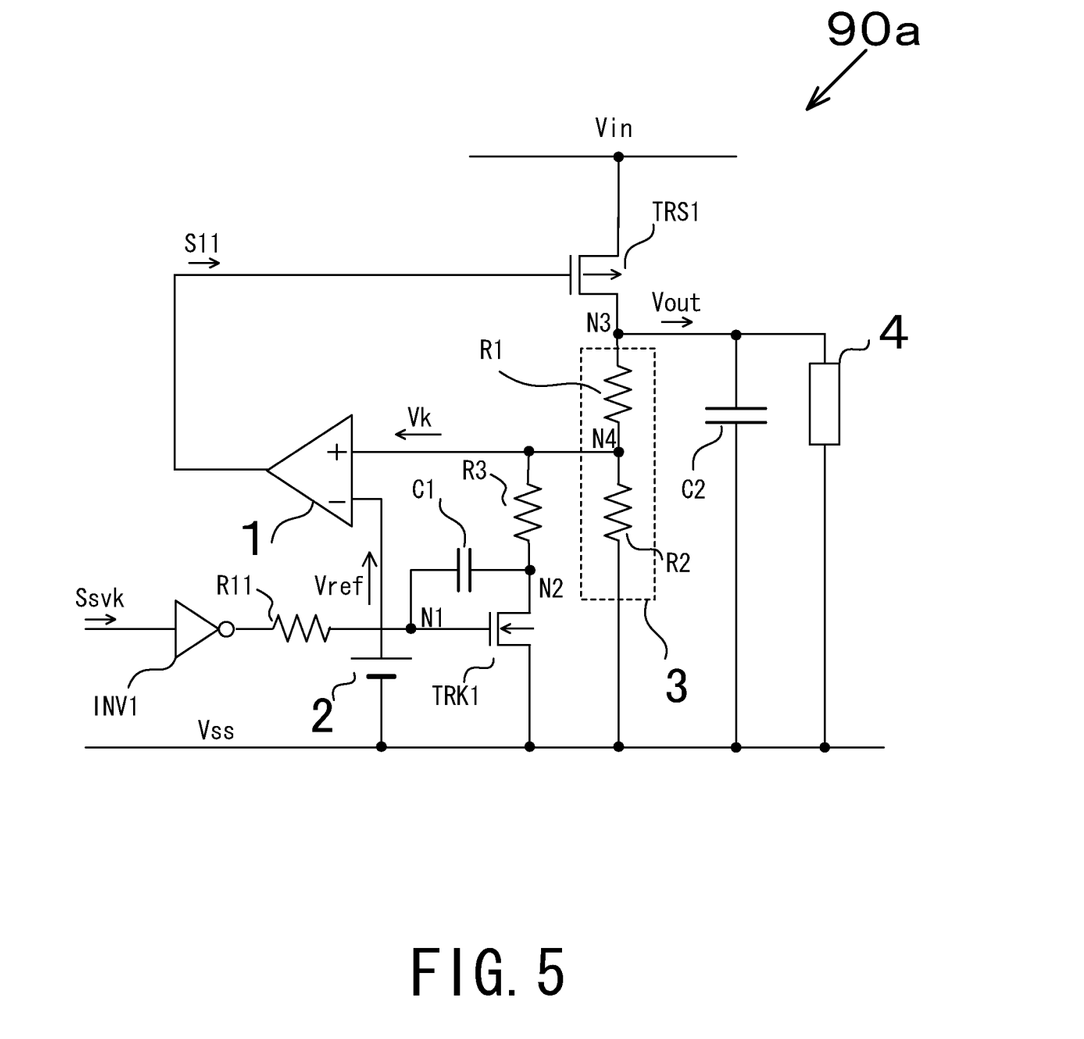
FIG. 5 is a circuit diagram illustrating a configuration of a series regulator according to a first modification.

Further, as in a series regulator 90a according to a first modification illustrated in FIG. 5, a resistor may be further provided. Specifically, a resistor R11 as a delay unit is provided between the inverter INV1 and the node N1. By the resistor R11, a voltage variation in the output voltage switching can be considerably suppressed even when a capacitance value of the condenser C1 is small.

Figure 6:
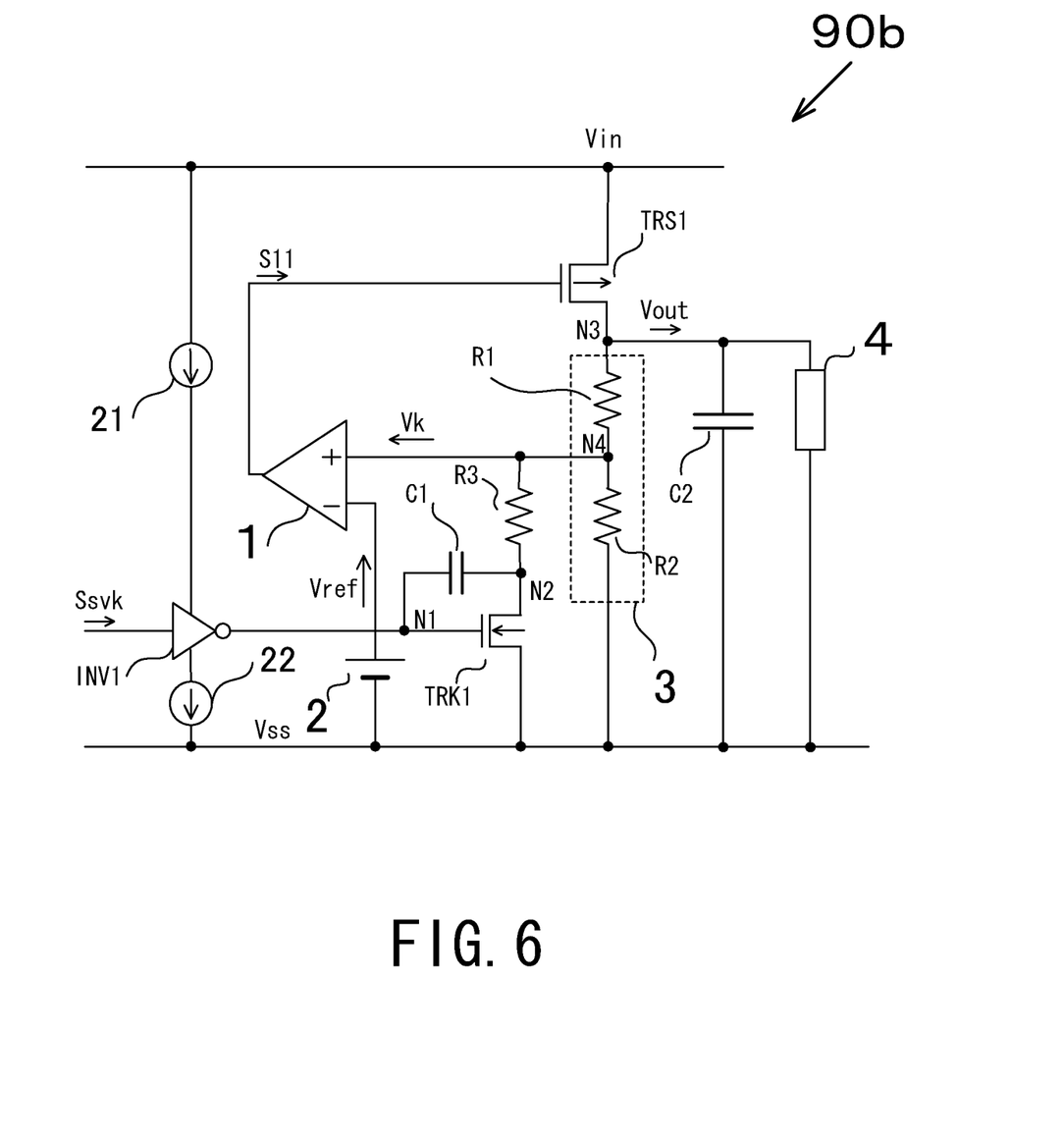
FIG. 6 is a circuit diagram illustrating a configuration of a series regulator according to a second modification.

Further, as in a series regulator 90b according to a second modification illustrated in FIG. 6, a first constant current source 21 and a second constant current source 22 may be provided. Specifically, the inverter INV1 receives the input voltage Vin through the first constant current source 21, and is connected to the low-potential power supply (ground potential) Vss through the second constant current source 22. By the first constant current source and the second constant current source, a voltage variation in the output voltage switching can be considerably suppressed even when a capacitance value of the condenser C1 is small.

Figure 7:
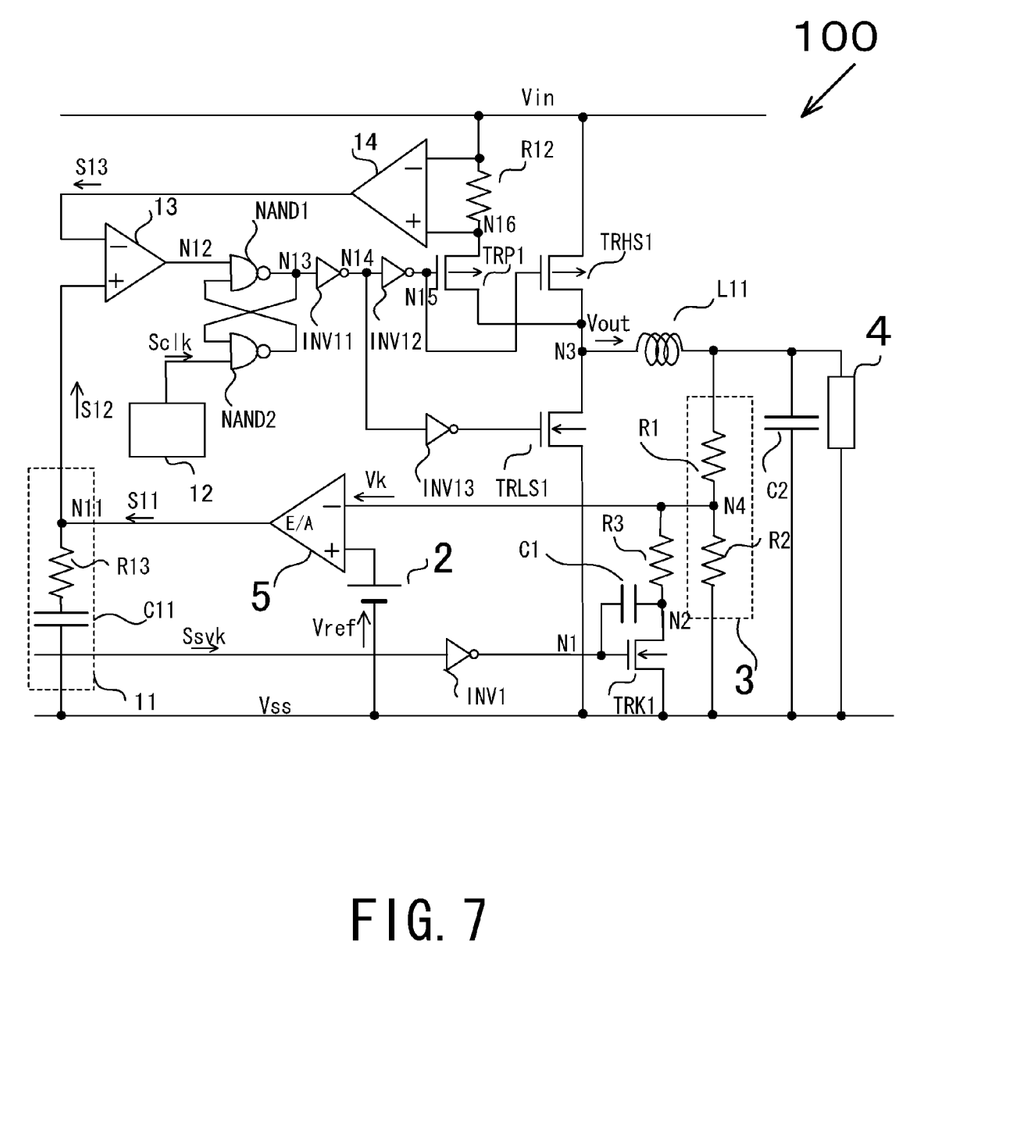
FIG. 7 is a circuit diagram illustrating a configuration of a DC-DC converter according to a second embodiment.

As an output voltage switching power supply apparatus according to a second embodiment, a DC-DC converter will be described with reference to the drawings. FIG. 7 is a circuit diagram illustrating a configuration of the DC-DC converter. In the embodiment, a condenser, which has one end connected to a drain of an output voltage switching transistor and the other end connected to a gate of the output voltage switching transistor, is provided to suppress a voltage variation in output voltage switching.

Hereinafter, the same elements as those in the first embodiment will be denoted by the same reference numerals, and a description thereof will be omitted.

As illustrated in FIG. 7, a DC-DC converter 100 includes a power supply 2, a voltage divider circuit 3, an error amplifier circuit 5, a phase compensator circuit 11, a clock generator circuit 12, a comparator circuit 13, a monitor amplifier circuit 14, a condenser C1, an inverter INV1, inverters INV11 to INV13, an inductor L11, a two-input NAND circuit NAND1, a two-input NAND circuit NAND2, a resistor R3, a resistor R12, an output voltage switching transistor TRK1, a high-side output transistor TRHS1, a transistor TRP1, and a low-side output transistor TRLS1.

The DC-DC converter 100 is a voltage-drop DC-DC converter that drops an input voltage Vin. The DC-DC converter 100 is an output voltage switching power supply apparatus that generates two types of output voltages (first output voltage Vout1 and second output voltage Vout2) by an on/off operation of the output voltage switching transistor TRK1.

The high-side output transistor TRHS1 is a P-channel MOSFET. The high-side output transistor TRHS1 has a first terminal (source) to which the input voltage Vin is input, a control terminal (gate) connected to a node N15, and a second terminal (drain) connected to a node N3.

The low-side output transistor TRLS1 is an N-channel MOSFET. The low-side output transistor TRLS1 has a first terminal (drain) connected to the node N3, a control terminal (gate) to which a signal of a node N14 is input through an inverter INV3, and a second terminal (source) connected to a low-potential power supply (ground potential) Vss.

An output voltage Vout is output from the node N3 (the second terminal (drain) of the high-side output transistor TRHS1 and the first terminal (drain) of the low-side output transistor TRLS1).

The inductor L11 has one end connected to the node N3, and the other end connected to one end of a resistor R1 of the voltage divider circuit 3. A condenser C2 and a load 4 are provided outside the DC-DC converter 100. The output voltage Vout is supplied to the load 4 through the inductor L11.

The transistor TRP1 is a P-channel MOSFET. The transistor TRP1 has a first terminal (source) connected to a node N16, a control terminal (gate) connected to a node N15, and a second terminal (drain) connected to the node N3. The resistor R12 has one end to which the input voltage Vin is input, and the other end connected to the node N16.

The monitor amplifier circuit 14 has a minus (−) input port connected to one end of the resistor R12, and a plus (+) input port connected to the other end of the resistor R12. The monitor amplifier circuit 14 monitors a current flowing through the resistor R12 when the transistor TRP1 is turned on, and outputs the monitoring result as a signal S13.

The error amplifier circuit 5 has a minus (−) input port (second input portion) to which a reference voltage Vk is input, and a plus (+) input port (first input portion) to which a reference voltage Vref is input, and outputs a processed signal S11. The error amplifier circuit 5 is an inverting comparator, and is also referred to as a differential amplifier circuit.

Herein, as in the first embodiment, when the output voltage switching transistor TRK1 is turned on, a first feedback voltage Vk1 is input to the minus (−) input port of the error amplifier circuit 5. When the output voltage switching transistor TRK1 is turned off, a second feedback voltage Vk2 is input to the minus (−) input port of the error amplifier circuit 5. When the feedback voltage Vk is lower than the reference voltage Vref, an amplified "high" level output signal is output from the error amplifier circuit 5. When the feedback voltage Vk is higher than the reference voltage Vref, a "low" level output signal is output from the error amplifier circuit 5.

The phase compensator circuit 11 is provided between a node N11 and the low-potential power supply (ground potential) Vss. The phase compensator circuit 11 includes a resistor R13 and a condenser C11 that are connected in series. The phase compensator circuit 11 compensates for the phase of the signal S11 (the signal of the node N11) output from the error amplifier circuit 5, and outputs an error-compensated signal S12.

The comparator circuit 13 has a minus (−) input port to which the signal S13 output from the monitor amplifier circuit 14 is input, and a plus (+) input port to which the signal S12 output from the phase compensator circuit 11 is input, and outputs an compared amplified signal from the output side (node N12).

The two-input NAND circuit NAND1 receives a signal of the node N12 and an output signal of the two-input NAND circuit NAND2, and outputs a logically-processed signal from the output side (node N13). The two-input NAND circuit NAND2 receives a signal of the node N13 and a clock signal Sclk output from the clock generator circuit 12, and outputs a logically-processed signal to the input side of the two-input NAND circuit NAND1.

The inverter INV11 inverts a signal of the node N13, and outputs the inverted signal from the output side (node N14). The inverter INV12 inverts a signal of the node N14, and outputs the inverted signal (signal of the node N15) to the control terminal (gate) of the transistor TRP1 and the high-side output transistor TRHS1. The inverter INV13 inverts a signal of the node N14, and outputs the inverted signal to the control terminal (gate) of the low-side output transistor TRLS1.

Herein, like the series regulator 90 as the output voltage switching power supply apparatus according to the first embodiment, the DC-DC converter 100 as the output voltage switching power supply apparatus according to the second embodiment may include a resistor R11 as a relay unit, a first constant current source, and a second constant current source. Accordingly, the DC-DC converter 100 can considerably suppress a voltage variation in output voltage switching even when a capacitance value of the condenser C1 is small.

As described above, the DC-DC converter as the output voltage switching power supply apparatus according to the second embodiment includes the power supply 2, the voltage divider circuit 3, the error amplifier circuit 5, the phase compensator circuit 11, the clock generator circuit 12, the comparator circuit 13, the monitor amplifier circuit 14, the condenser C1, the inverter INV1, the inverters INV11 to INV13, the inductor L11, the two-input NAND circuit NAND1, the two-input NAND circuit NAND2, the resistor R3, the resistor R12, the output voltage switching transistor TRK1, the high-side output transistor TRHS1, the transistor TRP1, and the low-side output transistor TRLS1. The condenser C1 is provided between the first terminal (drain) and the control terminal (gate) of the output voltage switching transistor TRK1.

By providing the condenser C1, a voltage variation of the feedback voltage Vk input to the minus (−) input port of the error amplifier circuit 5 can be alleviated by the mirror effect of the output voltage switching transistor TRK1 in the on/off operation of the output voltage switching transistor TRK1. Therefore, a voltage variation in the output voltage switching can be considerably suppressed.

Figure 8:
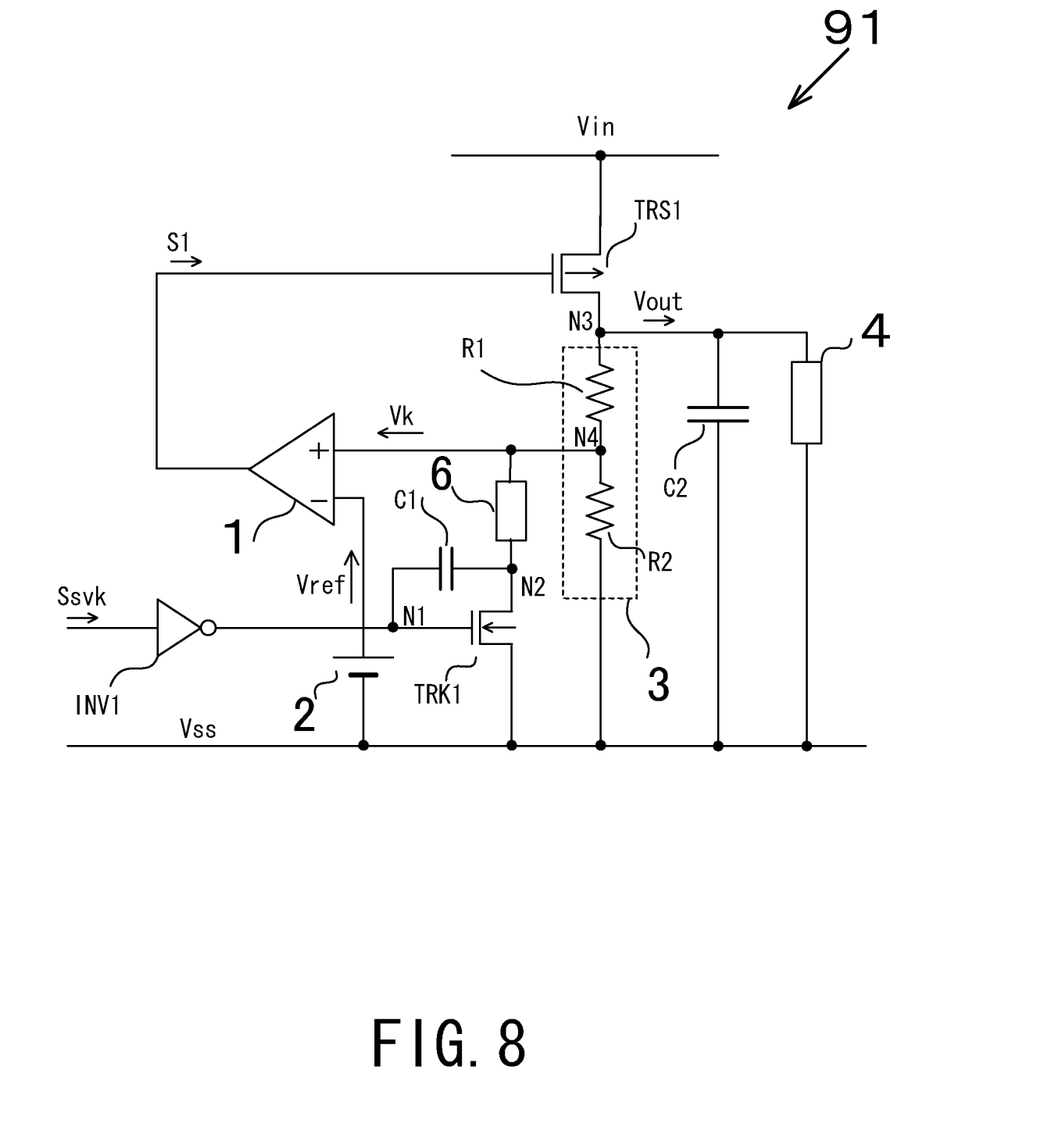
FIG. 8 is a circuit diagram illustrating a configuration of a series regulator according to a third embodiment.
Figure 9:
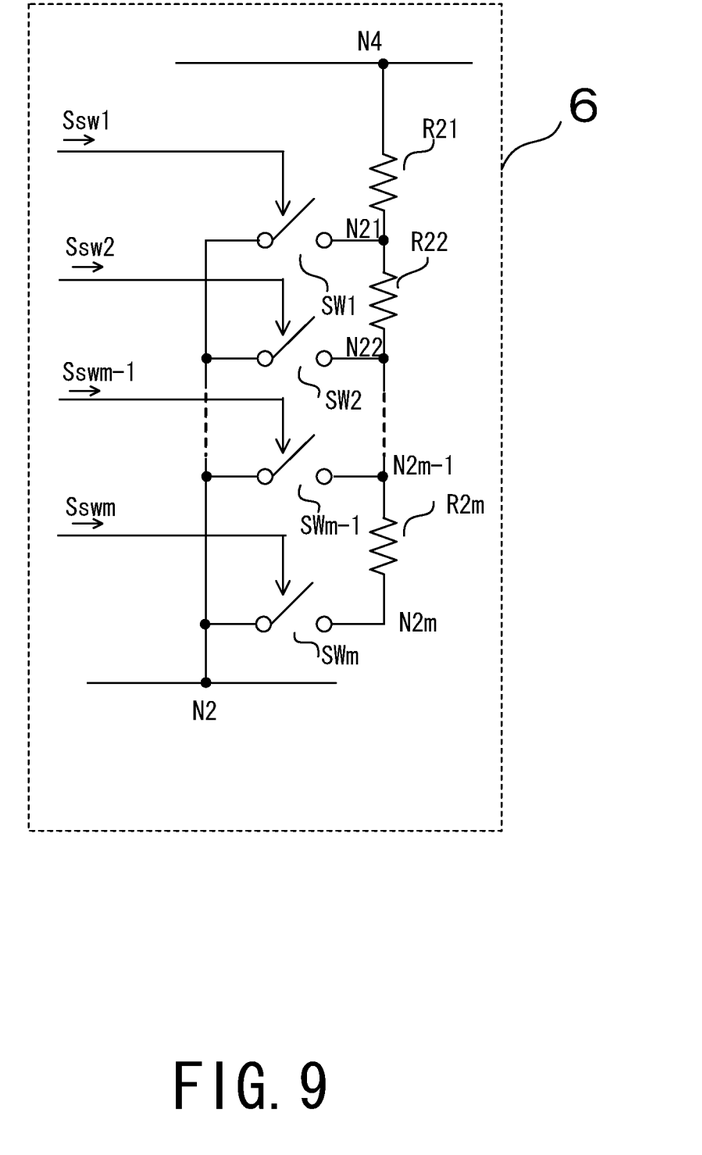
FIG. 9 is a circuit diagram illustrating a configuration of a trimming resistor portion according to the third embodiment.

As an output voltage switching power supply apparatus according to a third embodiment, a series regulator will be described with reference to the drawings. FIG. 8 is a circuit diagram illustrating a configuration of the series regulator. FIG. 9 is a circuit diagram illustrating a configuration of a trimming resistor portion. In the third embodiment, the trimming resistor portion is used to output three or more types of different-level output voltages.

As illustrated in FIG. 8, a series regulator 91 includes a differential amplifier circuit 1, a power supply 2, a voltage divider circuit 3, a trimming resistor portion 6, a condenser C1, an inverter INV1, an output voltage switching transistor TRK1, and an output transistor TRS1.

The series regulator 91 is a voltage-drop series regulator that drops an input voltage Vin. The series regulator 91 is an output voltage switching power supply apparatus that generates three or more types of output voltages through an on/off operation of the output voltage switching transistor TRK1 by using a resistance value selected by the trimming resistor portion 6. The trimming resistor portion 6 is provided between a node N4 and a node N2.

As illustrated in FIG. 9, the trimming resistor portion 6 includes m number of resistors (resistors R21 to R2m) and m number of switches (switches SW1 to SWm). The trimming resistor portion 6 may select m types of resistance values by the on/off control of a switch. Herein, m is an integer equal to or greater than 2.

The resistor R21 has one end connected to the node N4, and the other end connected to a node N21. The resistor R22 has one end connected to the node N21, and the other end connected to a node N22. The resistor R2m has one end connected to a node N2m−1, and the other end connected to a node N2m.

The switch SW1 has one end connected to the node N2 and the other end connected to the node N21, and is turned on/off based on a signal Ssw1. The switch SW2 has one end connected to the node N2 and the other end connected to the node N22, and is turned on/off based on a signal Ssw2. The switch SWm−1 has one end connected to the node N2 and the other end connected to the node N2m−1, and is turned on/off based on a signal Sswm−1. The switch SWm has one end connected to the node N2 and the other end connected to the node N2m, and is turned on/off based on a signal Sswm.

Herein, for example, when the switch SW1 is turned on and the other switches are turned off, the resistor R21 is selected. When the switch SW1 and the switch SW2 are turned on and the other switches are turned off, the resistor R21 and the resistor R22 connected in series are selected.

As described above, the series regulator as the output voltage switching power supply apparatus of the third embodiment includes the differential amplifier circuit 1, the power supply 2, the voltage divider circuit 3, the trimming resistor portion 6, the condenser C1, the inverter INV1, the output voltage switching transistor TRK1, and the output transistor TRS1. The trimming resistor portion 6 includes m number of resistors (resistors R21 to R2m) and m number of switches (switches SW1 to SWm). The condenser C1 is provided between the first terminal (drain) and the control terminal (gate) of the output voltage switching transistor TRK1.

By providing the condenser C1, three or more types of output voltages can be generated through the on/off operation of the output voltage switching transistor TRK1 by using the resistance value selected by the trimming resistor portion 6. In addition, a voltage variation in the output voltage switching can be considerably suppressed.

Further, in the DC-DC converter 100 according to the second embodiment, the trimming resistor portion 6 may be provided instead of the resistor R3.

While certain embodiments have been described, these embodiments have been presented by way of example only, and are not intend to limit the scope of the inventions. Indeed, the novel embodiments described herein may be embodied in a variety of the other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power supply apparatus, comprising:
a first transistor configured to output an output voltage;
a voltage divider circuit configured to divide the output voltage;
a second transistor including a first end connected to an output node of the voltage divider circuit, the second transistor being configured to operate based on an output voltage switching signal;
a first condenser provided between the first end of the second transistor and a control terminal of the second transistor;
a differential amplifier circuit configured to amplify a voltage from the voltage divider circuit based on a reference voltage, the differential amplifier circuit being configured to receive a first feedback voltage when the second transistor is turned on, and to receive a second feedback voltage, which is higher than the first feedback voltage, when the second transistor is turned off;
a first inverter configured to output the output voltage switching signal to the control terminal of the second transistor;
a first constant current source configured to output an input voltage to the first inverter; and
a second constant current source provided between the first inverter and a low-potential power supply.

2. The power supply apparatus according to claim 1, further comprising a first resistor provided between the output node of the voltage divider circuit and the first end of the second transistor.

3. The power supply apparatus according to claim 1, further comprising a trimming resistor portion configured to divide the output voltage, wherein the trimming resistor portion includes resistors connected in series and a plurality of switches and generates a resistance value selected from among a plurality of resistance values by control of the plurality of switches.

4. The power supply apparatus according to claim 1, wherein the power supply apparatus is a series regulator, and the differential amplifier circuit outputs a differentially amplified signal to a control terminal of the first transistor.

5. The power supply apparatus according to claim 4, wherein the first transistor is a P-channel MOSFET.

6. The power supply apparatus according to claim 1, wherein the power supply apparatus is a DC-DC converter and further comprises an inductor between the first transistor and the voltage divider circuit.

7. The power supply apparatus according to claim 6, wherein the first transistor is a high side output transistor, and the power supply apparatus further comprises a low side output transistor provided between the first transistor and the low-potential power supply.

8. The power supply apparatus according to claim 7, wherein the high side output transistor is a P-channel MOSFET, and the low side output transistor is an N-channel MOSFET.

9. The power supply apparatus according to claim 1, wherein the second transistor is any one of a MOSFET, a bipolar transistor, and a J-FET.

10. A power supply apparatus, comprising:
an output transistor including one end to which an input voltage is input and another end from which an output voltage is output;
a voltage divider circuit configured to generate a feedback voltage;
an output voltage switching transistor including one end connected to the feedback voltage side, wherein the output voltage switching transistor is configured to operate based on an output voltage switching signal, and wherein the output voltage switching signal is input to a control terminal of the output voltage switching transistor through a first inverter;
a first condenser including one end connected to one end of the output voltage switching transistor and another end connected to the control terminal of the output voltage switching transistor;
a differential amplifier circuit including a first input portion to which a reference voltage is input and a second input portion to which the feedback voltage is input, the differential amplifier circuit being configured to operate so that a first feedback voltage is input to the second input portion when the output voltage switching transistor is turned on, and so that a second feedback voltage, which is higher than the first feedback voltage, is input to the second input portion when the output voltage switching transistor is turned off;
a first constant current source; and
a second constant current source;
wherein the input voltage is input to the first inverter through the first constant current source, and the first inverter is connected to a low-potential power supply through the second constant current source.

* * * * *